United States Patent [19]
Petit-Clerc

[11] 3,808,440
[45] Apr. 30, 1974

[54] METHOD AND APPARATUS FOR MEASURING RADIOISOTOPE DISTRIBUTION

[75] Inventor: Yves Petit-Clerc, Sherbrooke, Quebec, Canada

[73] Assignee: Universite De Sherbrooke, Sherbrooke, Quebec, Canada

[22] Filed: Oct. 19, 1972

[21] Appl. No.: 299,125

[30] Foreign Application Priority Data
Oct. 29, 1971 Great Britain.................... 50361/71

[52] U.S. Cl................. 250/360, 250/366, 250/369
[51] Int. Cl.............................................. G01t 1/20
[58] Field of Search.......... 250/71.5 S, 71.5 R, 61.5, 250/52, 360, 366, 369

[56] References Cited
UNITED STATES PATENTS
2,167,115  7/1939  Kieffer............................... 250/61.5
3,591,806  7/1971  Brill et al......................... 250/71.5 S
3,573,458  4/1971  Anger............................... 250/71.5 S Primary Examiner—James W. Lawrence
Assistant Examiner—David L. Willis
Attorney, Agent, or Firm—Cushman, Darby & Cushman

[57] ABSTRACT

A tomographic detector for studying and measuring radioisotope distributions in the human body consists of detectors, used preferably with positron emitters, connected to coincidence circuits in such a way as to determine two channels of detection wherein one channel is slightly offset with reference to an axis of rotation about which the object of interest is rotated while the other channel includes the axis. The method of measuring the local activity consists of first calculating the response of both channels and to subtract the counts of one channel from the counts of the other channel. This method provides a sensitive detection of a given volume with a sharp cut-off and a very weak response in the surrounding region, thus providing equal lateral and depth resolution. The present technique is valuable for medical section scanning and slow dynamic studies requiring the measurement of local activity.

15 Claims, 8 Drawing Figures

METHOD AND APPARATUS FOR MEASURING RADIOISOTOPE DISTRIBUTION

The present invention relates to an apparatus and method for the detection and measurement of radioactivity in the human body.

Many diagnoses in nuclear medicine are based on the introduction in the patient of radioactive tracer marking substances which emit high energy photons (such as gamma-rays), and on the subsequent measurement of the radioisotope distribution inside the organism. For example, as a result of a greater vascularisation, a cerebral tumor may be detected and accurately located in a patient; this is done by exteriorly measuring the counting rate of the photons emitted from the different regions of the head.

Many devices for forming an image of the radio activity distribution are known commercially. However, one of the problems associated with these known detector systems and the data display obtained therefrom is the difficulty in viewing sources of radioactivity which may be hidden by overlying areas of radioactivity. Most of the previous methods of detection and measurement of radiosotope distributions in the human body relay on the measurement of the mean radioactivity over a large depth. This reduces the contrast to a large extent and may decrease the potential of a basically powerful method of medical investigation.

The most commonly used detectors for scanning are of the collimator focusing type, such as that described by G.V. Hine in an article entitled "Instrumentation in Nuclear Medicine" appearing in Academic Press, 1967. Positron scanning is also used because of the inherent focusing properties of coincidence measurements. However, if these methods are efficient in producing a very small region of detection at the focal plane, they all suffer from excessive detection sensitivity outside the plane of focusing. In fact, if a 50 percent detection profile is considered adequate, as in the case of some very good collimated detectors, a 12 percent isoresponse curve, for example, extends far from the region of focusing. The volume enclosed between the 12 percent and 50 percent surfaces is such that a much larger counting rate is obtained from this volume than from the volume of interest which is generally considered as being that inside the 50 percent surface. If the region of interest is deep within tissues, the response to a point source is lower than at the surface and still reduces the ratio of the counting from the desired region to the surrounding volume.

Many improvements have been brought to the above mentioned systems of detection. These improvements have permitted a more precise representation of the radioactivity distribution. However, secondary effects, such as the Compton diffusion in the tissues, the absorption in the tissues, the penetration of gamma rays through the collimator walls, are numerous and tend to render the measurement still very imprecise.

There is therefore an obvious need for a detector which, ideally would be sensitive to a given volume, not necessarily very small, but with a sharp cut-off and a very weak response in the surrounding region. Small lesions of a relatively low differential absorption could be more easily detected by such an apparatus and the measurement of absolute local activities could be feasible.

Broadly, the obtention of a very satisfactory measurement depends on the sensitivity and the resolution of the detector. The sensitivity of the detector is its attitude to detect very small variations of activity from one location to another. Although the time factor, i.e., the rapidity with which information is obtained, is understood to be part of the sensitivity concept, the counting rate only is not an absolute indication of the sensitivity. A high counting rate may contain very little information, such as a detector which would be sensitive to the total activity of the brain but which would be unable to measure the activity distribution. Secondly, adequate spectral resolution is a prime factor in the measurement of activity distributions. It has been found that the specifications of different devices existing in relation to this factor lead to great confusion. Certain types of detectors have, such as in the case of the scintillation detector, an excellent resolution in the focal plane but the detection profile greatly enlarges in depth on either side of the focal plane such that a greater counting rate is obtained outside the focal plane. These devices must be considered with care since they do not guarantee the detection of hot and cold points of increased or reduced radioactivity. A specification of the resolution in a plane for point sources teaches very little of the characteristics of a detector.

It is an object of the present invention to provide an improved detecting apparatus which overcomes the foregoing disadvantages and which is characterized by its increased depth resolution and high sensitivity.

It is also an object of the present invention to provide an apparatus and a method for detecting and measuring radioactivity distributions in the human body, which provides accurate measurement of local activity, even in the presence of a uniform radioactive distribution around the object of interest.

It is another object of the present invention to improve the accuracy of diagnoses for various physiological conditions in a patient.

The present invention therefore relates to a method for measuring radioisotope distribution in the human body comprising the steps of mounting on opposite sides of a selected region of the human body a plurality of gamma-ray detectors to define at least two channels of detection, disposing a first channel so as to extend through the center of the selected region and a second channel so as to extend excentrically of said center, scanning the selected region by providing simultaneous relative rotational movement between the detectors and the selected region; recording the counts received by the detectors for each channel; and substracting the counts of the first channel from the counts of the second channel to thereby effect a net count for the selected region.

The present invention also relates to an improved tomographic detector which consists of a series of detectors mounted to define a pair of detection channels wherein one channel is slightly offset with respect to the axis of rotation while the other channel includes the said axis, means being provided for supporting the detectors, for causing relative rotational movement between the detectors and the selected region, for recording and for substracting counts.

Other objects and advantages of the invention will become apparent as the following description proceeds, taken in conjunction with the accompanying drawings in which.

Prior to describing the present invention, a typical detecting and measuring system will be described. A position emitting substance, such as As 74, which tends to accumulate in certain types of tumors, is introduced into the patient. Once the radioactive substance has accumulated in the tissue of interest, the emitted positron will give rise to radiation which may be indicative of the location, configuration and other characteristics of the tissue. When an electron combines with a positron, the positron is annihilated and emits two gamma photons (of 511 Kev.). The detection is based on the knowledge of the position of the two photons at the time of the measurement, from which the travel of both gammas can be deducted; and, assuming an arbitrary focal plane, the position of the annihilation is also deducted.

Figure 1:
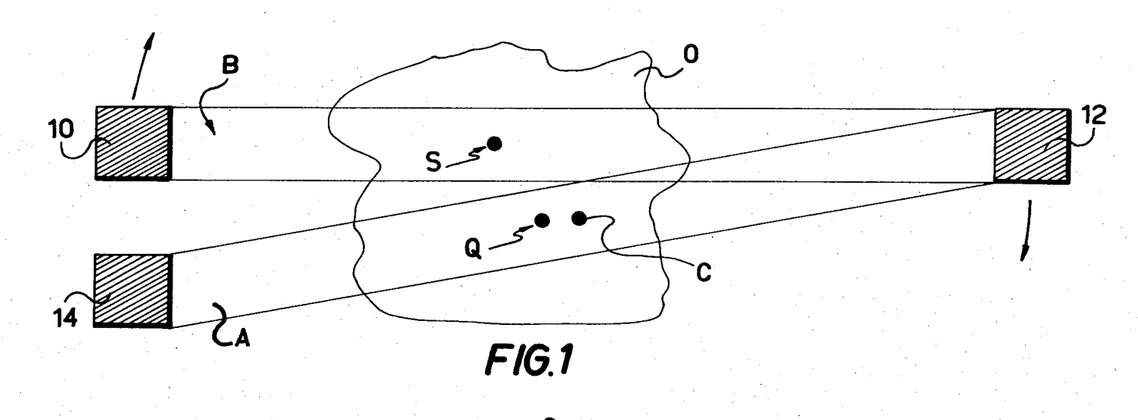
FIG. 1 is a schematic representation of two channels of detection using three detectors about an object of interest.

Referring to FIG. 1, there is shown a schematic representation of the present invention which consists in having two channels of detection A and B traversing an object O under investigation in which a positron emitting substance has been injected and is now concentrated. This object O may be a brain tissue. At least three detectors, numbered 10, 12 and 14 are used to provide these channels A and B. The detectors may be fixed on an assembly rotatable about their geometrical center C which is located in the middle of the detection channel A. The channel B is slightly offset with reference to this center C. If the whole detector assembly is rotated around its geometrical center, the probability of counting events, for a complete revolution, far from the center, will be nearly the same for channels A or B. However, channel A only detects radiation near the center. To illustrate, in FIG. 1, a point source Q is detected by detectors 12 and 14. Only channel A may register the count of the central region where point Q is located. However, since the detectors 10, 12, 14 are rotating, a point source at S is detected equally well by detectors 10–12 as well as by detectors 12–14. Taking the difference between A and B, a net count from the central region only is obtained. The counting rate must be sufficient to provide an appropriate statistic; in other words, the total number of counts accumulated must be sufficiently large so that the difference between the two values obtained is significant (larger than the statistical fluctuations of channels A and B). The rotational speed of the assembly is practically immaterial as long as there is a complete number of revolutions (that is for a small number); when the number of revolutions is considerable (say twenty and over), this requirement is no longer needed.

Figure 2:
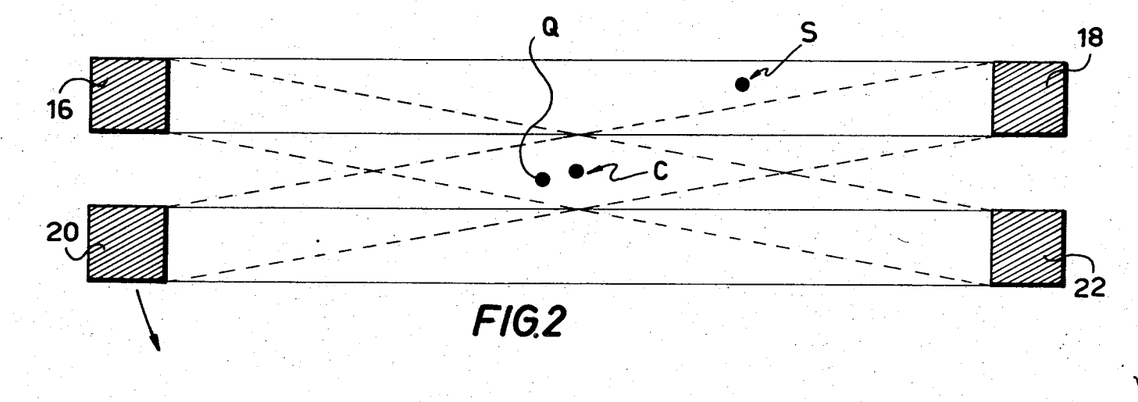
FIG. 2 is a schematic representation of two channels of detection using four detectors.
Figure 3:
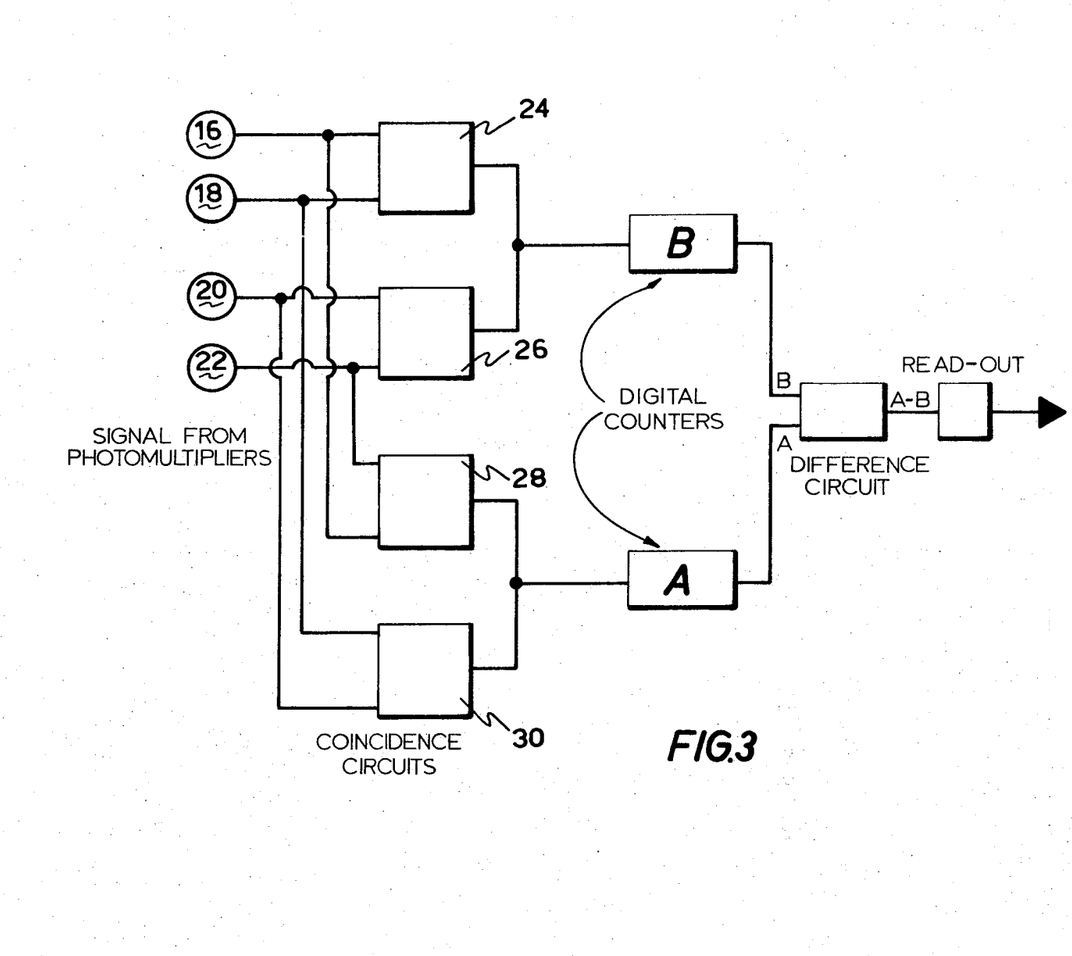
FIG. 3 is a block diagram of the data acquisition system used with the scanner of FIG. 2.

Referring to FIGS. 2 and 3, another method of obtaining optimum sensitivity consists in using one or more groups of four detectors 16, 18, 20, 22 connected to coincidence circuits 24, 26, 28, 30 in such a way as to determine four beams of detection:

16 working in coincidence with 22  ⎫
18 working in coincidence with 20  ⎬ channel A
16 working in coincidence with 18  ⎫
20 working in coincidence with 22  ⎬ channel B Counts are added to form channel A and channel B. The geometric center of the detector assembly. Again, if the whole assembly is rotated around its geometrical center, the probability of counting events, for a complete revolution, far from the center is nearby the same for channels A and B. Channel A detects only radiation near the center. To illustrate in FIG. 2, the point source Q can only be detected by detectors 16 and 22, 18 and 20 (channel A). Point source S is detected, during rotation, equally well by detectors 16–18, or 18–20, as well as 16–22, or 20–22.

The detectors need not be mounted on a rotatable assembly if the measurement is carried out on inert objects of small dimensions. In such cases, these objects may be mounted on a rotatable table and similar results are obtained. However, for medical application, a rotatable ring is usually constructed on which it is advantageous to mount many groups of detectors in order to increase the sensitivity. A typical circuitry for obtaining the substraction of counts between the two channels A and B in FIG. 2 is generally represented in FIG. 3.

Another way of carrying out the method of the present invention is to obtain channel A by coincidence using a positron emitting isotope and to obtain channel B by using a collimator detector which only measures unique gammas and has a detection channel which is cone shaped.

The performances of the present method are optimized by the use of positron emitters. However, this method is not restricted to the use of these isotopes. For instance, channel A may be formed by using a sufficiently long lead collimator cylindrically shaped, square shaped or rectangular shaped. In the case of coincidence detection, sensitivity is maximum when obtained at the center of rotation (where maximum information is wished to be obtained). In the case of the detection in channel B, this last characteristic eraggerates one fault which must be reduced or prevented.

As mentioned above, the measurement of the net response consists in calculating the response of channels A and B and then substracting B from A. However, it is not possible to calculate the net response from a pure analytic expression; hence, calculations are performed with the help of a PDP-9 computer or any other like calculator.

EXAMPLE

Figure 4:
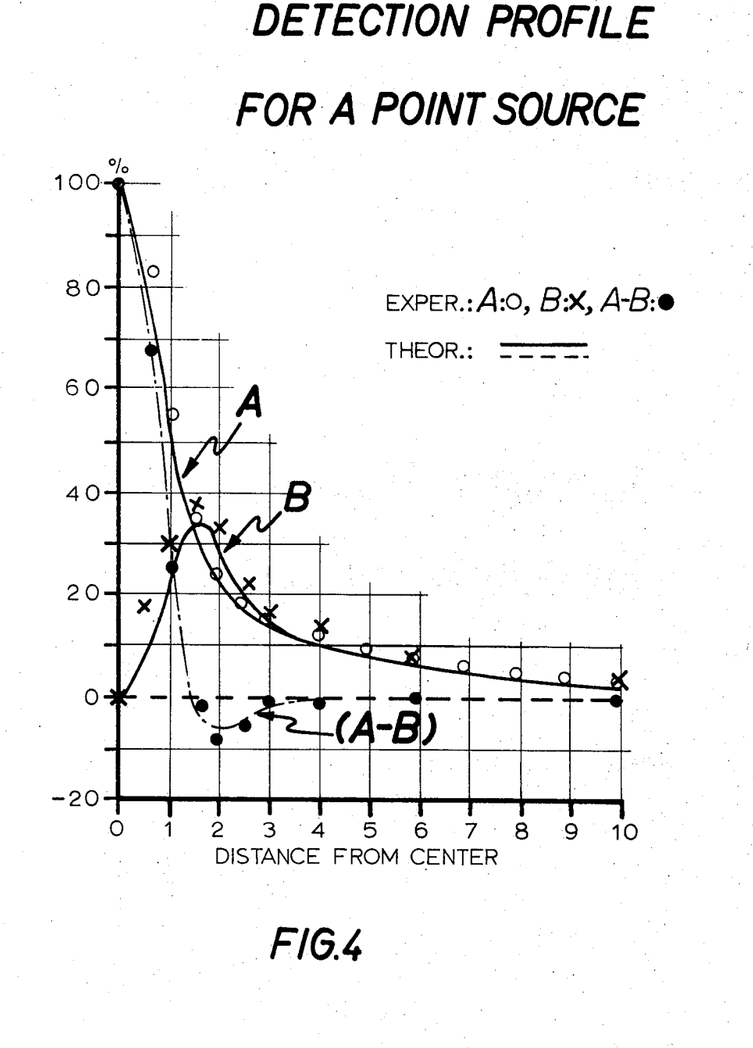
FIG. 4 is a graph illustrating a comparison of the calculated response and experimental values for crystals with a 1 inch × 1 inch detecting surface and with opposing crystals 20 inches apart.

FIG. 4 provides an example of the measured response of a point source using the following parameters: $L$ = 20 inches, $D$ = 1 inch, wherein $L$ is the distance between two opposing crystals, $D$ is the surface area of the crystals.

Figures 5A, 5B:
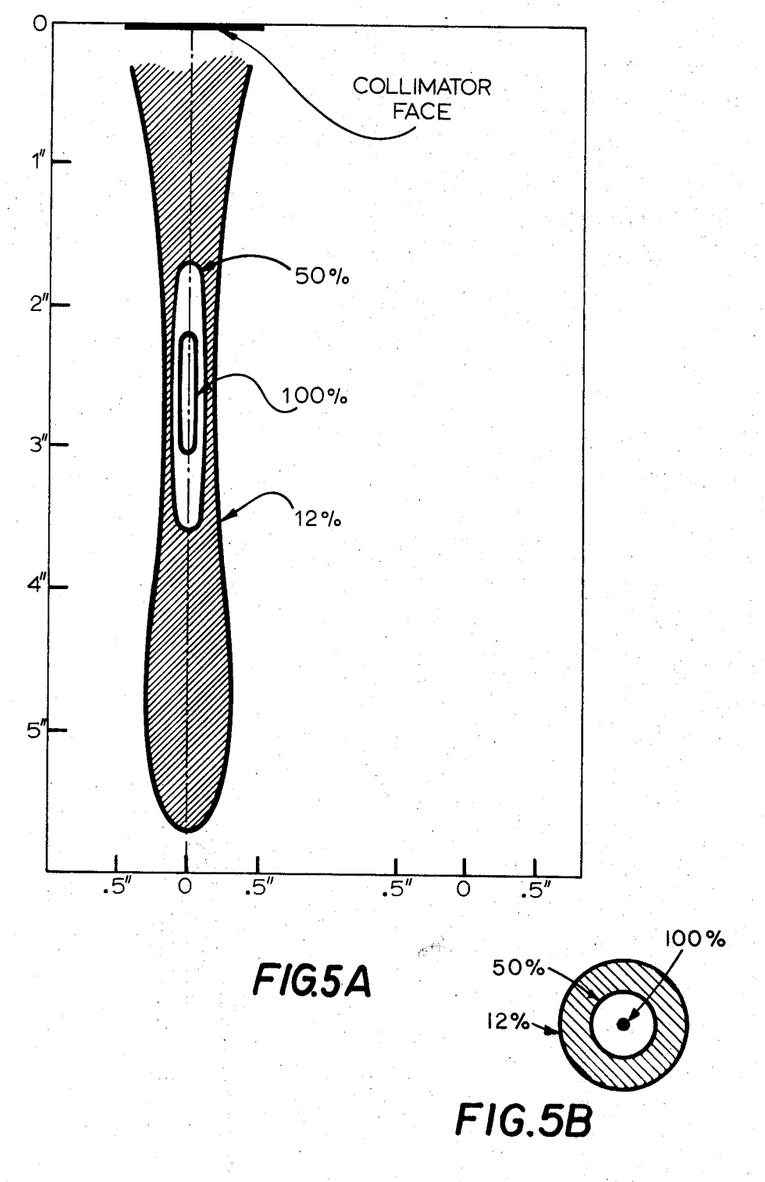
FIG. 5(A) shows a typical detection profile of a good collimated detector for low energy.
FIG. 5(B) shows a calculated detector profile of a rotary detector made in accordance with the present invention.

An experimental verification is made as represented by circles and "X's". To obtain the experimental values, fixed detectors were used for simplification and a 10μCi$^{22}$Na source was rotated at 10 r.p.m. The size of the radioactive source was 2 mm in diameter and the geometrical parameters were the same as for the theoretical curve. A comparison of the detection profile obtained with the rotary detector and a focusing collimator is shown in FIG. 5. The considerable improvement on the effective volume of detection obtained with the rotary detector (FIG. 5A) is quite evident.

Curve A–B of FIG. 4 defines the detection profile in a plane. The response outside this plane is determined by the thickness of the detectors and drops to zero outside this thickness due to the coincidence detection. The response linearly increases to the maximum value at the center of the detectors. The resolution can be further increased using smaller detectors. However, the sensitivity must be kept high enough, and a 1 inch by 1 inch is the smallest practical section for each detector.

The negative part of the curve is negligible if a point source is considered. But, in practical situations, it becomes objectionable. The curve A alone seems to give a sufficient resolution since a point source response is considered. It corresponds to usual tomography since the information from a given point is continuously recorded as the information from other sources is spread by the rotation of the detectors. However, in the case of a uniform distribution, the count rate produced outside the region of interest is much larger than is compatible with the high contrast multiplane scanning.

Figure 6:
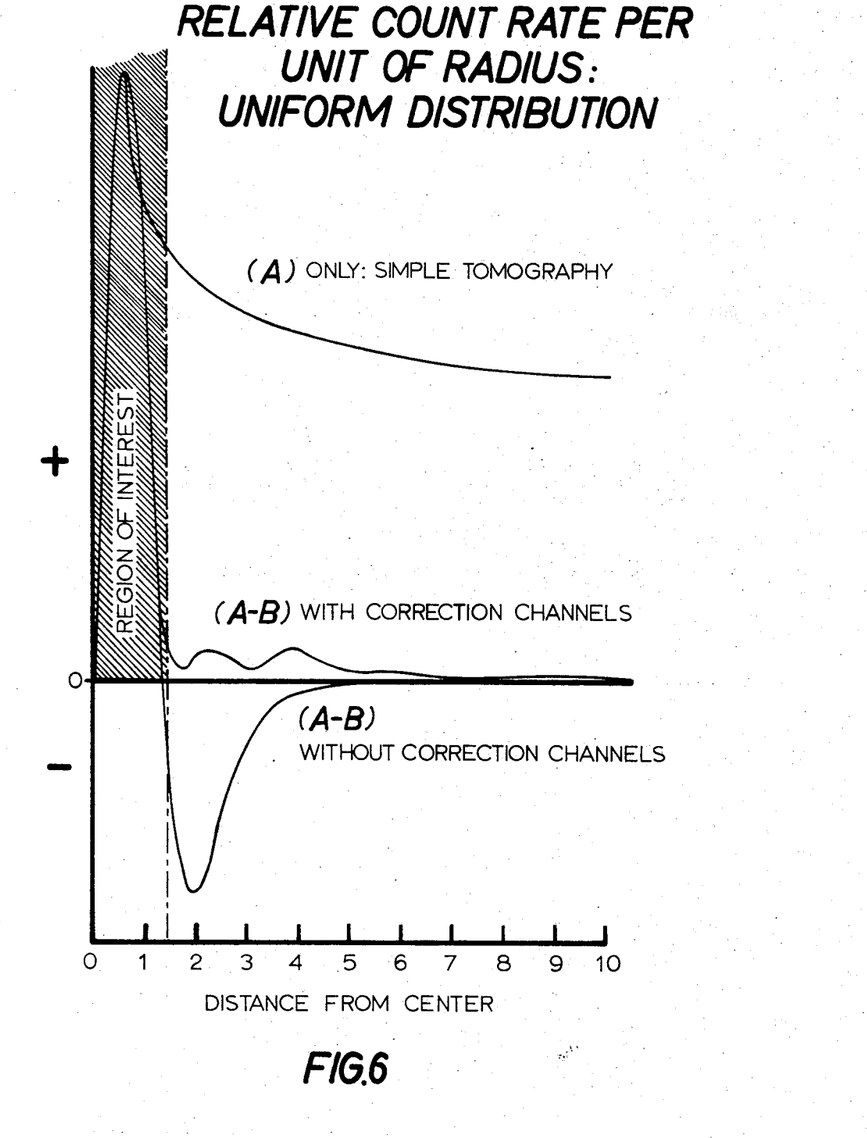
FIG. 6 is a graph illustrating the relative count rate per unit of radius for uniform distribution.
Figure 7:
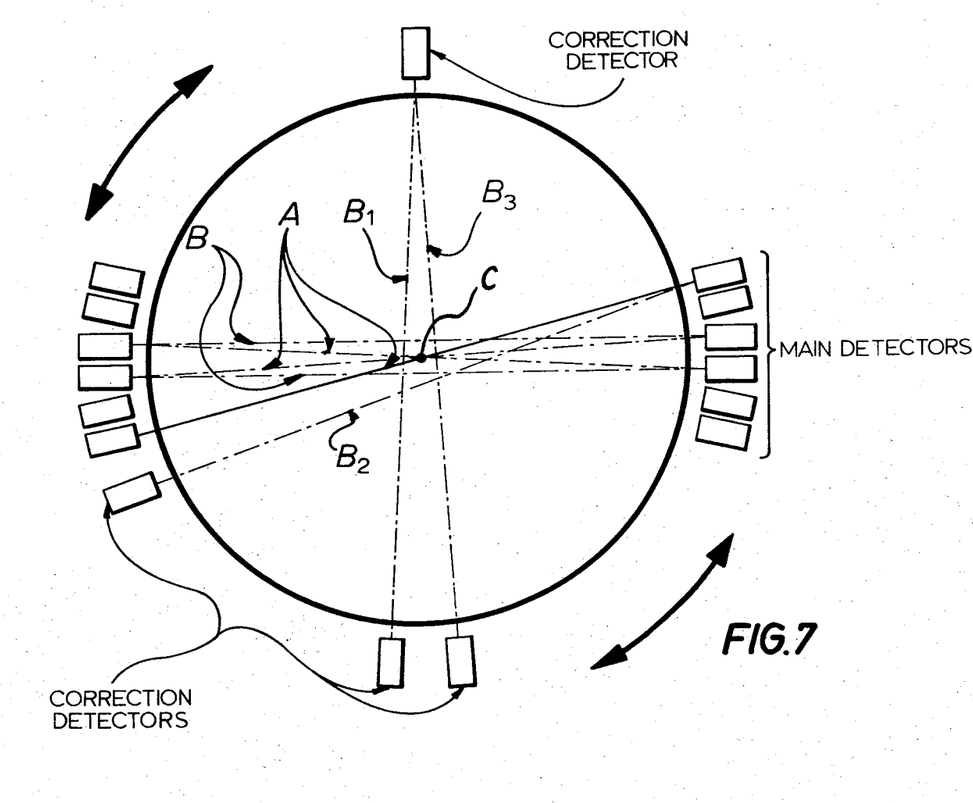
FIG. 7 is a top view of one scan arrangement of the present invention.

The curve A–B shows an important defect in the presence of a higher count rate from channel B at 2 centimeters from the axis of rotation. This can be eliminated (see FIG. 6) by the use of correction channels which are similar to channel B but with different geometrical parameters. The correction arrangement illustrated in FIG. 7 is one of many possible solutions using three additional channels $B_1$, $B_2$, $B_3$ having the following properties:

1. Channel $B_1$:
Detectors: 1.7 cm in the plane of rotation by 2.54 cm. Center of channel: at 1.85 cm from the center of rotation. Counts weighted by a factor ½ and added to channel A.

2. Channel $B_2$:
Detectors: 2.54 cm on the plane of rotation by 2.54 cm. Center of channel: at 2.57 cm from the center of rotation. Counts weighted by a factor ¼ and substracted from channel A.

3. Channel $B_3$:
Detectors: 1.7 cm in the plane of rotation by 2.54 cm.

Center of channel: at 3.07 cm from the center of rotation.

Counts weighted by a factor 1/12 and added to channel A.

This should only be regarded as an example of theoretical solution. It is possible to correct the profile with the same detectors used to form the main channels A and B. To increase the sensitivity, many groups of four detectors must be used, mounted on a ring. To get the correction channels, it is possible to use existing detectors at a proper distance from the center of rotation, by simply adding a coincidence circuit between them. Weighting of count rate can be accomplished either by dividing circuits, or by choosing the appropriate number of coincidence channels for correction, relative to the number of main channels.

As previously noted, the response to a point source gives only a partial indication of the performance of a scanning device. In practice, if a brain scan is considered, tumors are surrounded by a more or less uniform distribution of activity. The activity outside the volume of interest produces in some cases the total number of counts of channel B and a large part of the counts of channel A. The statistical fluctuations of A and B must be smaller than the total activity measured in the volume of interest. If the relative standard deviation of the total number of counts, to the net number of counts from a tumor occupying the volume of detection, is better than 25 percent it is likely to be easily detected.

As previously noted, in a practical setup, more than two pairs of detectors must be used to decrease statistical fluctuations. For instance, 32 detectors can be mounted on a ring 20 inches in diameter. For a 3 mCi of positron emitter, a good estimate of the mean concentration of the radioactivity distributed in the brain is 0.1 μCi/cc. If each detector is 1 inch by 1 inch at a distance of 10 inches from the axis of rotation, the solid angle for detection is $16/(10^2)$ steradians, and the fraction of the radiation in the right direction $0.16 \div 4\pi$. The detection volume is about 3cc which means that about 11,100 disintegrations per second produce 141 pairs of gamma rays in the direction of the detectors.

Assuming, for 511 Kev photons, the same linear absorption coefficient of 0.095 cm$^{-1}$ for brain tissues as for water, and a total thickness of 14 centimeters, one can calculate the loss due to absorption, considering a source in the middle of the brain. We get a 52 percent absorption for each of the two photons produced by annihilation of a positron. Since both must be detected coincidently, only $(52\%)^2$ or 27% reach the two detectors simultaneously. This loss is constant even if the source is at the surface of the brain, since the total path of the two photons is constant. We get about 36 counts/sec., which means that more than 3 seconds are necessary for each point. The sensitivity can be further increased by the use of many rings of 32 detectors each. If four rings are used, seven instead of four scanning points are determined if coincidence detection is accomplished between opposite detectors of two adjacent rings. This reduces the time to perform a complete scan in one plane to less than 5 minutes.

An important advantage is inherent to the method. Even in the absence of discriminators, Compton scattering has little on resolution. It is well known that fast coincidence between a pair of detectors reduces by a large amount the detection of scattered photons. The probability for one of the two annihilation photons to be scattered towards one of the detectors around the ring is weak. Furthermore, this probability is the same for channel A or B. Since the measurement is based on the substraction of B from A, the residual effect of Compton scattering can be virtually eliminated.

This advantage can justify the use of less efficient lead loaded plastic phosphors, since total absorption in the scintillator, and energy discrimination are not required. With plastic phosphors, random coincidences can be reduced by a large factor providing a high count rate capacity for the apparatus.

There are numerous applications of this method, since it renders possible the scan of a slice of an organ such as the brain or thyroid gland. Small tumors can be more easily detected because of an important increase in effective resolution over other methods. Absolute local activities can be measured, as opposed to a mean activity over a long cylinder measured by other methods. Major properties of the present method have been experimentally verified and are in excellent agreement with predicted resolution and sensitivity.

It is therefore wished to have it understood that the present invention is not limited in interpretation except by the scope of the following claims.

I claim:

1. A method for measuring radioisotope distribution in the human body comprising the steps of: mounting on opposite sides of a selected region of the human body a plurality of gamma-ray detectors to form at least first and second channels of detection; disposing the first channel so as to extend through the center of said selected region and the second channel so as to extend excentrically of said center; scanning said selected region by providing simultaneous relative rotational movement between said detectors and said selected region; recording the counts received by the detectors for each channel; and substracting the counts of said first channel from the counts of said second channel to thereby effect a net count for said selected region.

2. A method as defined in claim 1 wherein said detection channels are obtained by providing coincidence detection and by using a positron emitting isotope.

3. A method as defined in claim 2 wherein said first and second detection channels are obtained by providing first and second pairs of coaxially opposed detectors connected to coincidence circuits, the axes of said pairs being parallel: said first and second pairs of detectors defining a pair of excentrically located second detection channels a first detector of said first pair defining with an opposite detector of said second pair a first detection channel, and a second detector of said first pair defining with the other detector of said second pair another first detection channel.

4. A method as defined in claim 1 wherein said selected region of the human body is fixed and wherein the detectors are rotated therearound.

5. A method as defined in claim 1 wherein said first detection channel is formed by coincidence detectors using a positron emitting isotope, said second detection channel being obtained by using a collimating detector.

6. A method as defined in claim 1 wherein said first detection channel is formed by using a lead collimating detector relatively long, the second detection channel being formed by using a collimating detector.

7. A method as defined in claim 1 further comprising the step of disposing about said center correction channels excentrically located relative to said center for eliminating a higher count from said second detection channel than from said first detection channel.

8. A tomographic apparatus for measuring radioactivity in a selected region of the human body injected with a selected radioisotope, comprising a plurality of gamma-ray detectors, support means for supporting said detectors in a predetermined array, at least one pair of said detectors being coaxially opposed to define a first detection channel extending through the center of said array, one detector of said pair defining with a third detector a second detection channel extending excentrically of said center, means for scanning said selected region by providing simultaneous relative rotational movement between said detectors and said selected area, means for recording the counting rates received from said detection channels, and means for measuring the difference between the member of counting rates of said first detection channel from the counting rates of said second detection channel.

9. A tomographic apparatus as defined in claim 8 wherein said detectors are coincidence detectors, said injected radioisotope being a positron emitting isotope.

10. A tomographic apparatus as defined in claim 9 wherein said detectors include at least first and second pairs of coaxially opposed detectors mounted on said support means, the axes of said pairs being parallel, said pairs defining detection channels excentrically located relative to said center of said selected region, a first detector of said first pair defining with an opposed detector of said second pair said first detection channel extending through said center, a second detector of said first pair defining with the other detector of said second pair said second detection channel extending through said center of said selected area.

11. A tomographic apparatus as defined in claim 8 comprising means for rotating said support means around said center.

12. A tomographic apparatus as defined in claim 8 wherein said plurality of detectors include correction detectors mounted on said support means for eliminating a higher counting rate from said second detection channel than from said first detection channel.

13. A tomographic apparatus as defined in claim 10 wherein said detectors are connected to coincidence circuit means.

14. A tomographic apparatus as defined in claim 10 wherein said first channel is obtained by coincidence using a positron emitting isotope and wherein said second channel is formed by using a collimating detector.

15. A tomographic apparatus as defined in claim 10 wherein said first channel and second channels are obtained by using lead collimating detectors.

* * * * *